(12) United States Patent
Lee et al.

(10) Patent No.: US 11,417,100 B2
(45) Date of Patent: Aug. 16, 2022

(54) DEVICE AND METHOD OF GENERATING VIDEO SYNOPSIS OF SPORTS GAME

(71) Applicant: NCSOFT Corporation, Seoul (KR)

(72) Inventors: Younghyun Lee, Seongnam-si (KR);
Jaemyung Lee, Seongnam-si (KR);
Jusung Lee, Seongnam-si (KR);
Hyunjo Jung, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 67 days.

(21) Appl. No.: 17/105,009

(22) Filed: Nov. 25, 2020

(65) Prior Publication Data

US 2021/0350140 A1 Nov. 11, 2021

(30) Foreign Application Priority Data

May 8, 2020 (KR) .................. 10-2020-0054979

(51) Int. Cl.
*G06K 9/00* (2022.01)
*G06V 20/40* (2022.01)

(52) U.S. Cl.
CPC ............. *G06V 20/47* (2022.01); *G06V 20/42* (2022.01); *G06V 20/49* (2022.01); *G06V 20/44* (2022.01)

(58) Field of Classification Search
CPC ........ G06V 20/47; G06V 20/49; G06V 20/42; G06V 20/44
See application file for complete search history.

(56) References Cited

U.S. PATENT DOCUMENTS

2019/0237107 A1* 8/2019 Newman .............. H04N 9/8205
2019/0354763 A1* 11/2019 Stojancic ......... H04N 21/44008
2021/0334546 A1* 10/2021 Zhang .................... G16H 40/63

* cited by examiner

*Primary Examiner* — David F Dunphy
(74) *Attorney, Agent, or Firm* — Sughrue Mion, PLLC

(57) ABSTRACT

Provided is a method of generating a video synopsis of a sports game including: based on a video including a sports game and log information sequentially recording events occurring in the sports game, determining an event section of the video corresponding to a preset event; determining a search section in the video based on log information and the determined event section; detecting a preset object in at least one scene section included in a search section; and generating a first video based on the at least one scene section in which the preset object is detected.

20 Claims, 15 Drawing Sheets

DEVICE AND METHOD OF GENERATING VIDEO SYNOPSIS OF SPORTS GAME

STATEMENT OF GOVERNMENTAL SUPPORT

This research was supported by Development of original technology for artificial intelligence industry through the Institute for Information and Communications Technology Promotion (IITP) funded by the Ministry of Science and ICT(2019-0-01771-002)

CROSS-REFERENCE TO RELATED APPLICATION

This application claims the benefit of Korean Patent Application No. 10-2020-0054979, filed on May 8, 2020, in the Korean Intellectual Property Office, the disclosure of which is incorporated herein in its entirety by reference.

BACKGROUND

1. Field

One or more embodiments relate to a device and a method of generating a video synopsis of a sports game.

2. Description of the Related Art

Machine learning refers to a field of artificial intelligence that evolves from the study of pattern recognition and computer learning theory, and a field of developing algorithms and technologies that enable computers to learn.

The core of machine learning lies in representation and generalization. Representation is the evaluation of data, and generalization is the processing of data that is not yet known. These are also fields of computational learning theory.

Deep learning is defined as a set of machine learning algorithms that attempt a high level of abstraction through a combination of various nonlinear transformation techniques, and in a big way, can be said to be a field of machine learning that teaches computers how people think.

Character recognition is a field of pattern recognition that attempts to realize human ability to recognize characters and understand their meanings with vision information through a computer, and has been partially commercialized in the fields of optical character recognition, automatic mail classification, document recognition, drawing recognition, etc. Nowadays, character recognition technology has entered a new stage through applications of the latest technologies of artificial intelligence such as neural networks, fuzzy, and genetic algorithms, and the fusion of related disciplines such as natural language processing, psychology, physiology, and cognitive science.

SUMMARY

One or more embodiments include a device and a method of generating a video synopsis of a sports game capable of generating a video synopsis of a sports game based on a video including a sports game and log information.

In addition, one or more embodiments include a device and a method of generating a video synopsis of a sports game capable of determining a search section from a video including a sports game and generating a video based on a scene included in the determined search section.

In addition, one or more embodiments include a device and a method of generating a video synopsis of a sports game capable of adding a description to a video synopsis of a sports game.

In addition, one or more embodiments include a device and a method of generating a video synopsis of a sports game capable of detecting a preset object by determining a search section from a video including a sports game and dividing or classifying the determined search section into a plurality of scenes.

According to one or more embodiments, a method of generating a video synopsis of a sports game includes: based on a video including a sports game and log information sequentially recording events occurring in the sports game, determining an event section of the video corresponding to a preset event; determining a search section in the video based on the log information and the determined event section; detecting a preset object in at least one scene section included in the search section; and generating a first video based on the at least one scene section, in which the preset object is detected.

In addition, the method of generating the video synopsis of the sports game may further include generating a second video based on the determined event section of the video.

In addition, the method of generating the video synopsis of the sports game may further include generating a video synopsis of a sports game by combining the generated first video and the generated second video based on the log information.

In addition, the method of generating the video synopsis of sports game may further include adding a description of the detected preset object to the generated first video based on the log information.

In addition, the determining of the event section of the video may include identifying a video including a sports game and log information sequentially recording events occurring in the sports game; tagging game information related to the video to the video; and extracting at least one piece of log information corresponding to the preset event and determining an event section corresponding to the extracted log information from the tagged video.

In addition, the determining of the search section in the video may include obtaining a time section corresponding to the determined event section from the video based on the log information; and determining a search section in the video based on a time section corresponding to the obtained event section.

In addition, the detecting of the preset object may include dividing the search section into a plurality of scene sections by applying a first method to the determined search section; classifying each of the plurality of divided scene sections by scene type by applying a second method to each of the plurality of divided scene sections; and detecting the preset object in at least one scene section classified into a preset scene type from among the plurality of classified scene sections.

In addition, the first method may be a scene change detection method, and the second method may be a scene recognition method.

In addition, the detecting of the preset object may include pre-processing the at least one scene section.

In addition, the detecting of the preset object may include detecting the preset object by applying a character detection and recognition method to the at least one scene section.

In addition, the generating of the first video may include determining a representative scene section based on the number of detections of the preset object; and generating the first video based on the determined representative scene section.

According to one or more embodiments, a device for generating a video synopsis of a sports game includes at least one processor, wherein the at least one processor, based on a video including a sports game and log information sequentially recording events occurring in the sports game, determines an event section of the video corresponding to a preset event, determines a search section in the video based on the log information and the determined event section, detects a preset object in at least one scene section included in the search section, and generates a first video based on the at least one scene section in which the preset object is detected.

In addition, the at least one processor may generate a second video based on the determined event section of the video.

Further, the at least one processor may generate a video synopsis of a sports game by combining the generated first video and the generated second video based on the log information.

In addition, the at least one processor may add a description of the detected preset object to the generated first video based on the log information.

Also, the at least one processor may identify a video including a sports game and log information sequentially recording events occurring in the sports game, tag game information related to the video to the video, extract at least one log information corresponding to the preset event, and determine an event section corresponding to the extracted log information from the tagged video.

In addition, the at least one processor may obtain a time section corresponding to the determined event section from the video based on the log information, and determine a search section in the video based on a time section corresponding to the obtained event section.

In addition, the at least one processor may divide the search section into a plurality of scene sections by applying a first method to the determined search section, classify each of the plurality of divided scene sections by scene type by applying a second method to each of the plurality of divided scene sections, and detect the preset object in at least one scene section classified into a preset scene type from among the plurality of classified scene sections.

In addition, the first method may be a scene change detection method, and the second method may be a scene recognition method.

Also, the at least one processor may pre-process the at least one scene section.

In addition, the at least one processor may detect the preset object by applying a character detection and recognition method to the at least one scene section.

In addition, the at least one processor may determine a representative scene section based on the number of detections of a preset object, and may generate the first video based on the determined representative scene section.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
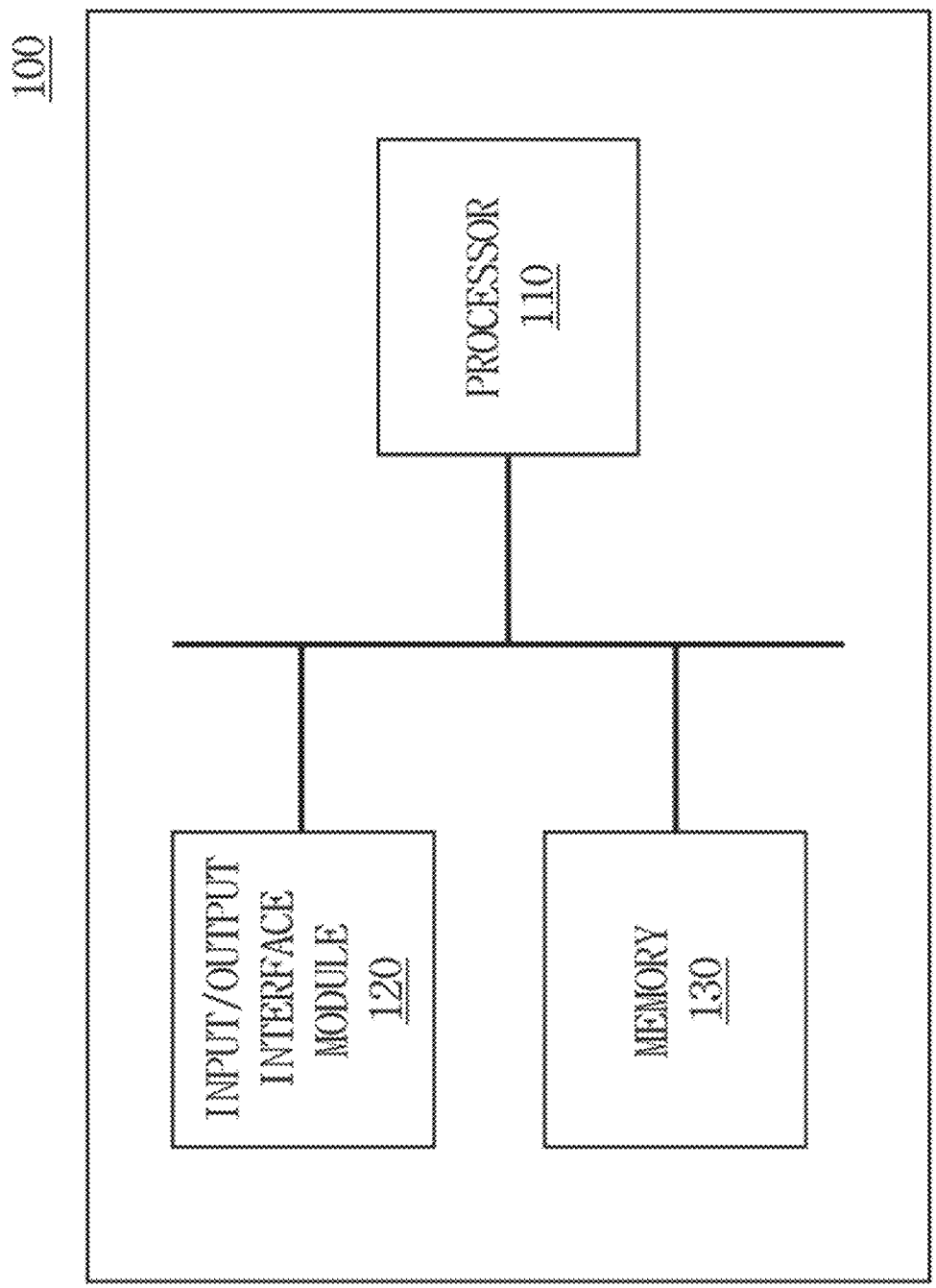
FIG. 1 is a view of a configuration of a device for generating a video synopsis of a sports game according to an embodiment.

Specific structural or functional descriptions for embodiments according to the disclosure disclosed herein are merely illustrative for the purpose of illustrating embodiments according to the disclosure. The embodiments according to the disclosure may be implemented in various forms and are not limited to the embodiments described herein.

The embodiments according to the disclosure may be variously modified and have various forms, so that the embodiments are illustrated in the drawings and described in detail herein. However, this does not limit the disclosure within specific embodiments and it should be understood that the disclosure covers all the modifications, equivalents, and replacements within the idea and technical scope of the disclosure.

It will be understood that, although the terms first, second, etc. may be used herein to describe various elements, these elements should not be limited by these terms. These terms are only used to distinguish one element from another. For example, as long as within the scope of the disclosure, a first element may be named as a second element, and a second element may be named as a first element.

Further, if it is described that one element is "connected" or "accesses" the other element, it is understood that the one element may be directly connected to or may directly access the other element but unless explicitly described to the contrary, another element may be "connected" or "access" between the elements. However, if it is described that one element is "directly connected" or "directly accesses" the other element, it is understood that there are no other elements exists between them. Other expressions that describe the relationship between elements, such as "between" and "directly between" or "adjacent to" and "directly adjacent to" should be understood as above.

The terms used in this application, only certain embodiments have been used to describe, is not intended to limit the disclosure. As used herein, the singular forms "a," "an," and "the" are intended to include the plural forms as well, unless the context clearly indicates otherwise.

It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which embodiments belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, the same reference numerals denote the same components, and unnecessary redundant explanations and descriptions of known technologies will be omitted.

In the embodiment of the disclosure, 'communication', 'communication network' and 'network' may be used in the same sense. The three terms refer to wired and wireless local and wide area data communication networks capable of transmitting and receiving a file from among a user terminal, terminals of other users, and a download server.

Hereinafter, preferred embodiments of the disclosure will be described in detail with reference to the accompanying drawings.

FIG. 1 is a view of a configuration of a device for generating a video synopsis of a sports game 100 according to an embodiment.

Referring to FIG. 1, the device for generating a video synopsis of a sports game 100 includes a processor 110, an input/output interface module 120, and a memory 130.

The processor 110, the input/output interface module 120, and the memory 130 constituting the device for generating a video synopsis of a sports game 100 are connected to each other, and may transmit data to each other.

The processor 110 may execute programs or instructions stored in the memory 130. In this case, an operation program (e.g., OS) for operating the device for generating a video synopsis of a sports game 100 may be stored in the memory 130.

The processor 110 may execute a program for managing information about the device for generating a video synopsis of a sports game 100.

The processor 110 may execute a program for managing an operation of the device for generating a video synopsis of a sports game 100.

The processor 110 may execute a program for managing an operation of the input/output interface module 120.

i) Determination of Event Section of Video Corresponding to Preset Event

The processor 110 may receive a video including a sports game from a broadcasting station through the input/output interface module 120, or may obtain the video through a separate storage device.

The processor 110 may identify the obtained video from, for example, videos of the same kind of sport games on different dates or videos of different types of sport games on the same date.

The processor 110 may obtain log information sequentially recording events occurring in a sports game.

The processor 110 may identify the obtained log information from, for example, log information about the same kind of sport games on different dates or log information about different types of sport games on the same date.

According to an embodiment, when the sports game is baseball, log information obtained by the processor 110 may include information about a game situation and information about a subject. The information about the game situation may be information about innings, scores, ball counts, runner status, number of pitchers, a pitcher change, a batter change, hitting, a double play, a home run, a sacrifice fly, etc., but the information about the game situation is not limited thereto. The information about the subject may be information about a batter, a pitcher, a runner, a pinch runner, etc., but the information about the subject is not limited thereto.

The processor 110 may tag game information related to a video including a sports game on the video. Tagging game information to a video will be described in more detail in FIG. 2 below.

The processor 110 may extract at least one piece of log information corresponding to a preset event, and may determine at least one event section corresponding to the at least one piece of extracted log information from the tagged video.

When there are a plurality of preset events, the processor 110 may extract plural pieces of log information respectively corresponding to the plurality of preset events, and may determine a plurality of event sections respectively corresponding to the plural pieces of extracted log information from the tagged video.

The processor 110 may generate a second video by combining videos corresponding to the determined event sections based on log information, but a reference for the combination for the second video is not limited to the log information.

ii) Determination of Search Section

The processor 110 may determine a search section in the video based on log information and a determined event section.

The processor 110 may obtain at least one time section (start point in time and end point in time of the event section) corresponding to the determined event section from the video based on the log information.

The processor 110, when the determined event section is plural in the video based on the log information, may obtain a plurality of time sections (start points in time and end points in time of the event sections) respectively corresponding to the plurality of determined event sections.

The processor 110 may determine a search section based on log information (e.g., player change information).

According to an embodiment, when the processor 110 determines between an $n^{th}$ event and an $(n+1)^{th}$ event as a search section, the processor 110 may determine between an end point in time of a time section corresponding to an $n^{th}$ event section and a start point in time of a time section corresponding to an $(n+1)^{th}$ event section as a search section.

iii) Detection of Preset Object

The processor 110 may detect a preset object in at least one scene section included in a search section.

The processor 110 may recognize a plurality of scene sections included in the search section by applying a first method to the search section. In this case, the first method may be a scene change detection method, but is not limited thereto.

The processor 110 may divide the search section into a plurality of scene sections based on the plurality of recognized scene sections.

The processor 110 may classify each of the plurality of divided scene sections by scene type by applying a second method to each of the plurality of divided scene sections. In this case, the second method may be a scene recognition method, but is not limited thereto. In addition, the scene type may be changed according to a sports game.

According to an embodiment, when the above sports game is baseball, the processor 110 may classify each of a plurality of scene sections into one of pitching, pitching enlargement, close-up, field (ball tracking), advertisement, commentary, spectators, dugout, game sketch, field view, and dual screen (PIP), but the type of scene into which each of the plurality of scene sections is classified is not limited thereto.

The processor 110 may detect the preset object in at least one scene section classified into a preset scene type from among the plurality of classified scene sections.

The processor 110 may determine a scene type for detecting the preset object.

According to an embodiment, when the sports game is baseball, the processor 110 may determine a close-up scene as the type of scene for detecting a player's name or uniform number.

The processor 110 detect the preset object in a plurality of scene sections classified into different preset scene types from among the plurality of classified scene sections.

The processor 110 may determine a plurality of scene types for detecting the preset object.

According to an embodiment, when the sports game is baseball, the processor 110 may determine a close-up scene, a field scene, a dugout scene, and the like as the type of scene for detecting a player's name or uniform number.

The processor 110 may add a scene type for detecting the preset object.

The processor 110 may pre-process the at least one scene section before detecting the preset object in at least one scene section classified into a preset scene type from among the plurality of classified scene sections. At this time, the pre-processing may be changed according to the sports game.

According to an embodiment, when the sports game is baseball, the processor 110 may mask a broadcast subtitle area included in a scene section for detecting a player's name or uniform number as scene section pre-processing.

The processor 110 may apply a character detection and recognition method to a scene section in order to detect a preset object, but a method of detecting the preset object is not limited thereto.

According to an embodiment, when the sports game is baseball, the processor 110 may detect a player's name or uniform number by applying optical character recognition (OCR) to a scene section, but a method applied to detect the player's name or uniform number is not limited thereto.

iv) Generation of First Video

The processor 110, based on the number of detections of a preset object in each of a plurality of scene sections classified into the same scene section, may determine at least one representative scene section from among the plurality of scene sections.

According to an embodiment, when the sports game is baseball, the processor 110, based on the number of detections of a preset object in each of a plurality of scene sections classified into a close-up scene, may determine at least one representative scene section from among the plurality of scene sections.

The processor 110, based on the number of detections of a preset object in each of a plurality of scene sections classified into different scene sections, may determine at least one representative scene section from among the plurality of scene sections.

According to an embodiment, when the sports game is baseball, the processor 110, based on the number of detections of a preset object in each of a plurality of scene sections classified into close-up scenes, field scenes, and dugout scenes, may determine at least one representative scene section from among the plurality of scene sections.

The processor 110 may generate a first video based on the at least one determined representative scene section.

The processor 110 may obtain a section in which a preset object is detected in the entire determined representative scene section.

The processor 110 may generate a first video by extracting a preset section from the obtained section in which a preset object is detected. In this case, the preset section may be a section from a point in time that goes back by a preset time from the end of the section in which a preset object is detected to the end of the section in which a preset object is detected, but is not limited thereto.

According to an embodiment, when the sports game is baseball and the preset object is a player's name, the processor 110 may obtain a section in which the player's name is detected in the entire representative scene section, and may generate the first video by extracting a section from a point in time that goes back by a preset time (e.g., 4 seconds) from the end of the obtained section to the end of the section in which the player's name is detected.

The processor 110 may generate a plurality of first videos based on log information.

The processor 110 may add a description of a detected preset object to the first video based on the log information. In this case, the description may be implemented in the form of a window and may be expressed by overlapping the first video.

According to an embodiment, when the sports game is baseball and the preset object is a player's name, the processor 110 may add a description of the player's name (e.g., a pitcher change or pinch hitter) to the first video based on the log information. In this case, the description may be implemented in the form of a window and may be expressed by overlapping the first video.

v) Generation of Video Synopsis of Sports Game

The processor 110 may generate a video synopsis of a sports game by combining a first video generated based on a scene section in which a preset object is detected and a second video generated based on an event section of a video including a sports game, based on log information.

The processor 110, by combining videos corresponding to the event section of the video including the sports game based on the log information, may generate a video synopsis of a sports game by inserting the first video into the already generated second video based on the log information. In this case, the first video may be plural.

According to an embodiment, when the sports game is baseball and the first video is a player introduction video, the processor 110, by combining videos corresponding to the event section of the video including the sports game based on the log information, may generate a video synopsis of a sports game by inserting the first video, which is the player introduction video, into the already generated second video based on the log information. In this case, the first video may be plural.

The processor 110 may generate the second video by combining videos corresponding to the event section of the video including the sports game based on the log information, and may generate a video synopsis of a sports game by inserting the first video into the generated second video based on the log information. In this case, the first video may be plural.

According to an embodiment, when the sports game is baseball and the first video is a player introduction video, the processor 110 may generate the second video by combining videos corresponding to the event section of the video including the sports game based on the log information, and may generate a video synopsis of a sports game by inserting the first video, which is the player introduction video, into the generated second video based on the log information. In this case, the first video may be plural.

The processor 110 may generate a video synopsis of a sports game by combining n first videos generated based on a scene section in which a preset object is detected and m second videos generated based on an event section of a video including the sports game, based on log information.

According to an embodiment, when the sports game is baseball and the first video is a player introduction video, the processor 110 may generate new videos by combining the first video in front of a second video generated based on a first event section occurring after a player change, and may generate a video synopsis of a sports game by combining the generated new videos. In this case, the first video and the second video may be plural.

The input/output interface module 120 may be connected to an external device (e.g., a server) through a network.

The input/output interface module 120 may obtain data from the external device.

The input/output interface module 120 may obtain a video including a sports game and log information sequentially recording events occurring in the sports game.

The input/output interface module 120 may obtain a user's input.

The input/output interface module 120 may be provided integrally with the device for generating a video synopsis of a sports game 100.

The input/output interface module 120 may be provided separately from the device for generating a video synopsis of a sports game 100.

The input/output interface module 120 may be a separate device to be communicatively connected to the device for generating a video synopsis of a sports game 100.

The input/output interface module 120 may include a port (e.g., a USB port) for connecting to an external device.

The input/output interface module 120 may include a monitor, a touch screen, a mouse, an electronic pen, a microphone, a keyboard, a speaker, an earphone, a headphone, or a touch pad.

The input/output interface module 120 may obtain training data for training.

The memory 130 may store data obtained through the input/output interface module 120.

The memory 130 may store tag information extracted by the processor 110.

The memory 130 may store a scene tagged by the processor 110.

The memory 130 may store the second video generated by the processor 110.

The memory 130 may store a time section obtained by the processor 110.

The memory 130 may store a search section determined by the processor 110.

The memory 130 may store a plurality of scene sections divided by the processor 110.

The memory 130 may store scene sections classified by the processor 110.

The memory 130 may store scene types for classifying scene sections.

The memory 130 may store scene types determined by the processor 110.

The memory 130 may store scene types added by the processor 110.

The memory 130 may store the first video generated by the processor 110.

The memory 130 may store the video synopsis of the sports game generated by the processor 110.

Figure 2:
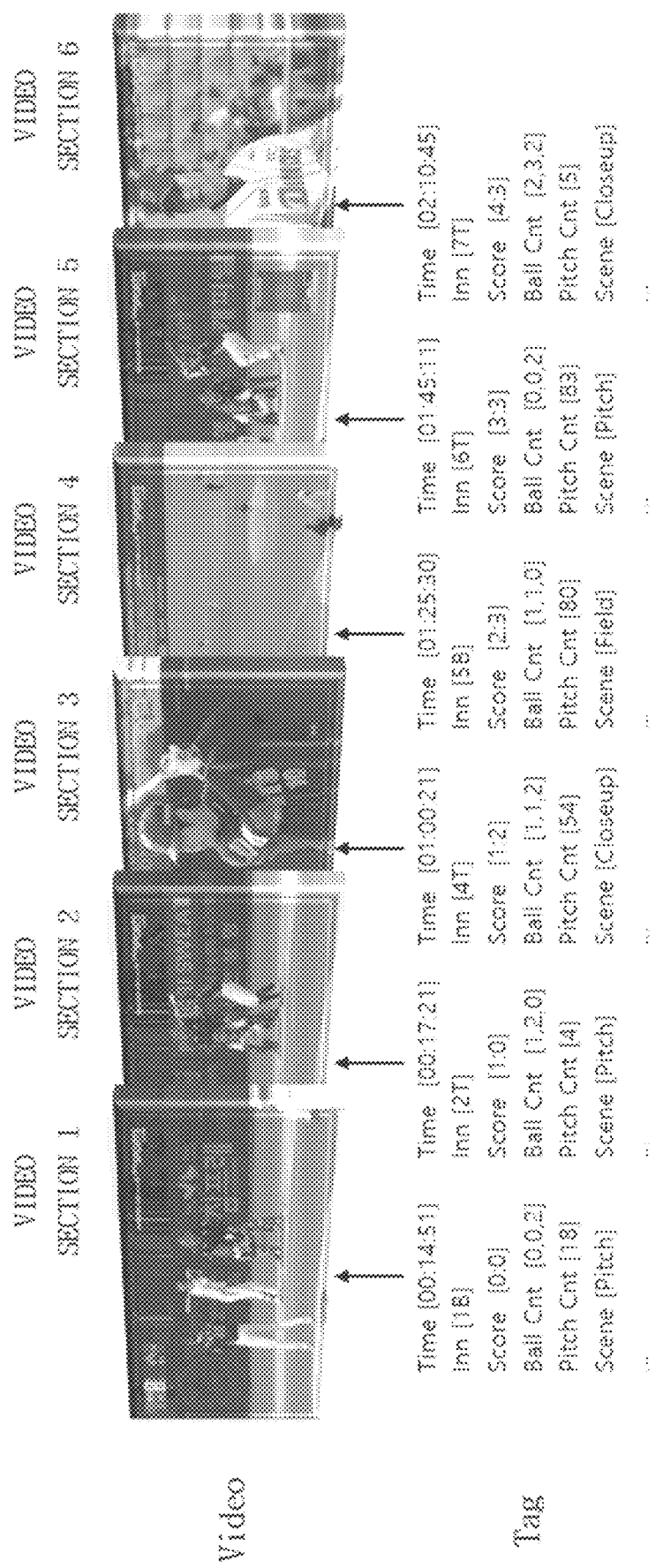
FIG. 2 is a view illustrating tagging of game information to a video according to an embodiment.

FIG. 2 is a view illustrating tagging of game information to a video according to an embodiment.

Referring to FIG. 2, a device for generating a video synopsis of a sports game may identify a video including a baseball game including a plurality of events. The device for generating a video synopsis of a sports game may receive a video from a broadcasting station in real time or may identify the video through a separate storage device.

The device for generating a video synopsis of a sports game may tag game information and scene information to the video. For example, game information and scene information including a score of 0:0 at the bottom of the first inning, 2 out, 18 pitches, and pitch may be tagged to video section 1. For another example, game information and scene information including a score of 1:0 at the top of the second inning, 1 ball-2 strikes, 4 pitches, and pitching may be tagged to video section 2.

Figure 3:
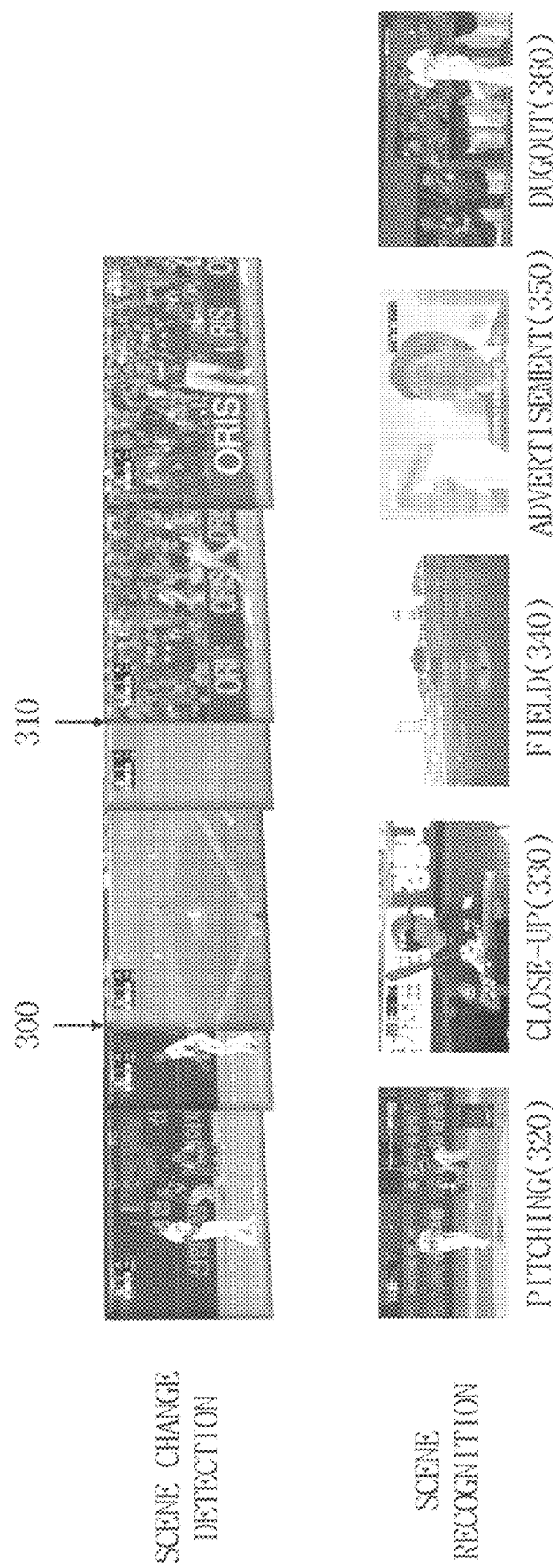
FIG. 3 is a view illustrating a state in which a device for generating a video synopsis of a sports game detects a scene change from a video and recognizes a scene of the video, according to an embodiment.

FIG. 3 is a view illustrating a state in which a device for generating a video synopsis of a sports game detects a scene change from a video and recognizes a scene of the video, according to an embodiment.

Referring to FIG. 3, according to an embodiment, the device for generating a video synopsis of a sports game may recognize not only game information but also scene information and may tag the information to a corresponding frame. In this case, the scene information may include whether a scene is changed and scene recognition.

The scene change detection indicates that a screen of a displayed baseball game is changed. For example, a frame before a display 300 indicates a scene related to a pitcher, a frame between the display 300 and the mark 310 indicates a scene related to a runner stealing base, and a frame after the display 310 indicates a scene showing the runner. Accordingly, the device for generating a video synopsis of a sports game may detect that a scene is switched between frames in the displays 300 and 310. That is, the device for generating a video synopsis of a sports game may detect whether a scene is changed from a video, and may tag detected information about whether or not a scene is changed to a corresponding video portion.

The device for generating a video synopsis of a sports game may recognize a scene of a baseball game video according to a preset standard. In more detail, the device for generating a video synopsis of a sports game may set preset references such as pitching, pitching enlargement, close-up, field (ball tracking), advertisement, commentary, spectators, dugout, game sketch, field view, and dual screen (PIP), and may recognize which reference the video corresponds to. For example, the device for generating a video synopsis of a sports game may recognize a picture 320 as a scene corresponding to pitching, a picture 330 as a scene corresponding to a close-up, a picture 340 as a scene corresponding to a field, a picture 350 as a scene corresponding to an advertisement, and a picture 360 as a scene corresponding to a dugout.

Figure 4:
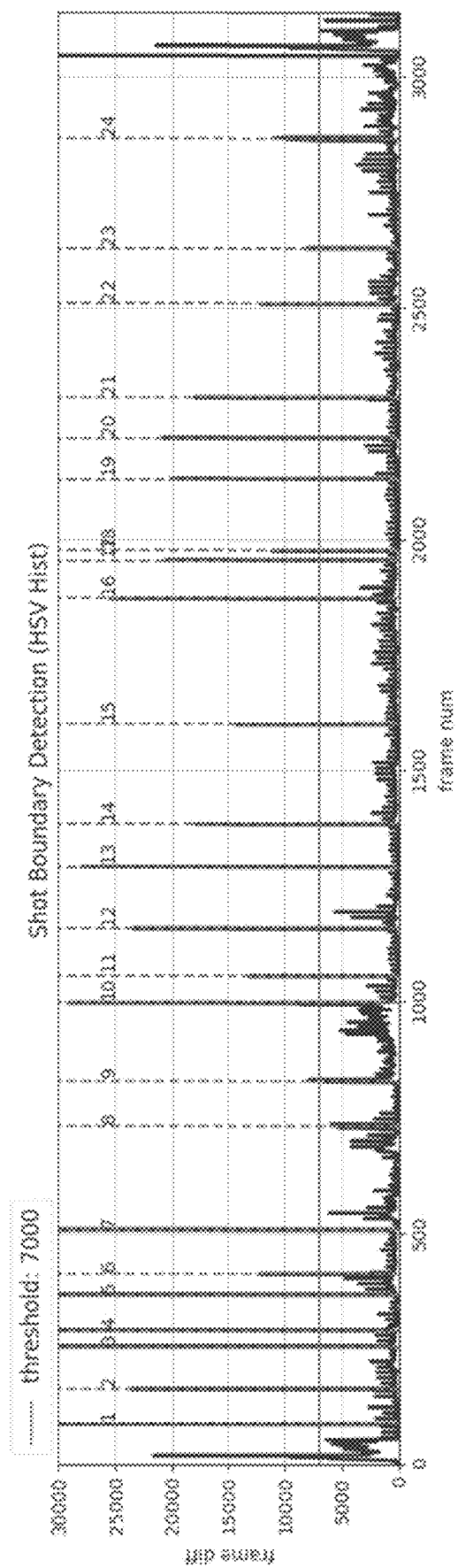
FIG. 4 is a graph that serves as a reference for detecting a scene change according to an embodiment.

FIG. 4 is a graph that serves as a reference for detecting a scene change according to an embodiment.

Referring to FIG. 4, the device for generating a video synopsis of a sports game may convert RGB colors into Hue, Saturation, and Value (HSV). The device for generating a video synopsis of a sports game may perform HSV pixel quantization on the converted HSV.

The device for generating a video synopsis of a sports game may determine a histogram difference between the previous frame and the current frame for each channel of the HSV.

The device for generating a video synopsis of a sports game may determine an average of histogram differences in relation to all bins (one section of histogram).

The device for generating a video synopsis of a sports game may compare the average of histogram differences with a preset reference to detect whether a scene is changed.

When the average of histogram differences is greater than a threshold value (e.g., 7000), which is the preset reference, the device for generating a video synopsis of a sports game may determine that the current frame is a scene transition from the previous frame.

When the average of histogram differences is less than a threshold value (e.g., 7000), which is the preset reference, the device for generating a video synopsis of a sports game may determine that the current frame is a scene not transition from the previous frame.

Figure 5:
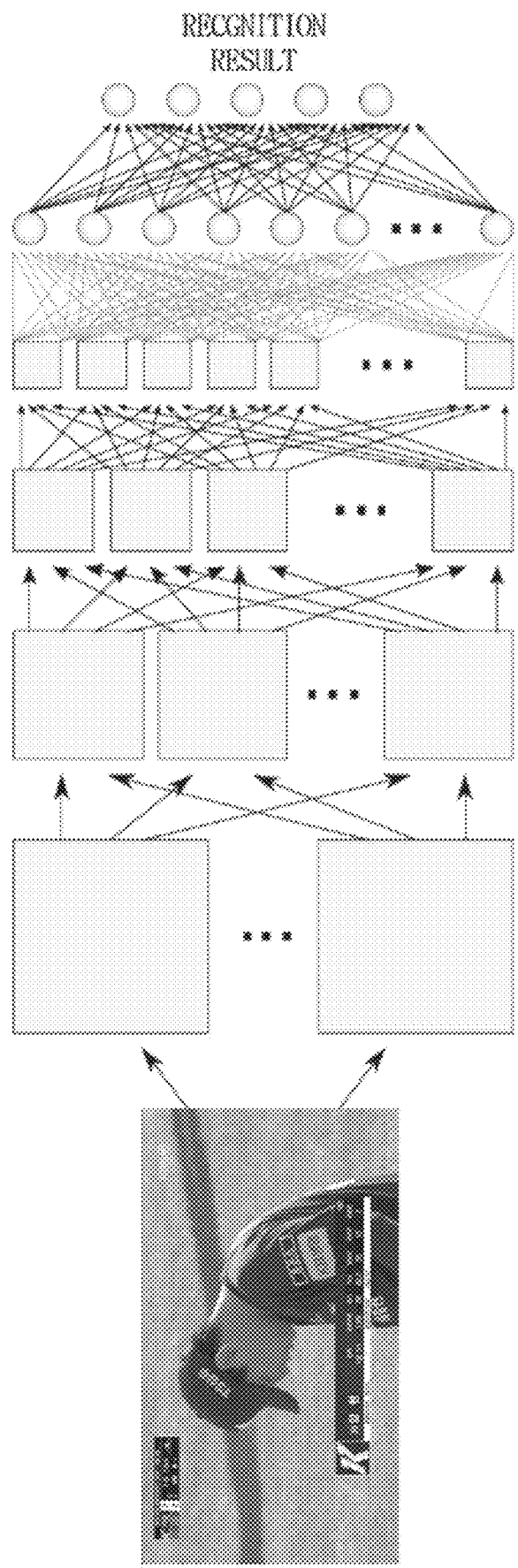
FIG. 5 is a view illustrates scene recognition based on deep learning, according to an embodiment.

FIG. 5 is a view illustrates scene recognition based on deep learning, according to an embodiment.

Referring to FIG. 5, the device for generating a video synopsis of a sports game may classify each of a plurality of scene sections by scene type by applying deep learning having a ResNet v2 structure as an example of deep learning. In this case, the scene type may be changed according to a sports game.

The device for generating a video synopsis of a sports game may obtain training data in order to apply the deep learning having a ResNet v2 structure, and may train a scene recognizer using the obtained training data.

According to an embodiment, when the above sports game is baseball, the device for generating a video synopsis of a sports game may classify each of the plurality of scene sections divided by scene change detection into any one of a pitching scene, a pitching enlargement scene, a close-up scene, a field (ball tracking) scene, an advertisement scene, a commentary scene, a spectators scene, a dugout scene, a game sketch scene, a field view scene, and a dual screen (PIP) scene, but the type of scene into which each of the plurality of scene sections is classified is not limited thereto.

The device for generating a video synopsis of a sports game may classify each of the plurality of scene sections into a scene type that best matches from among certain references by applying deep learning having a ResNet v2 structure to each of the plurality of scene sections divided by scene change detection. At this time, the device for generating a video synopsis of a sports game may accumulate a scene recognizer score for each of the plurality of scene sections divided by scene change detection, and may classify each of the plurality of scene sections divided by scene change detection into a scene type having the highest score.

Figure 6:
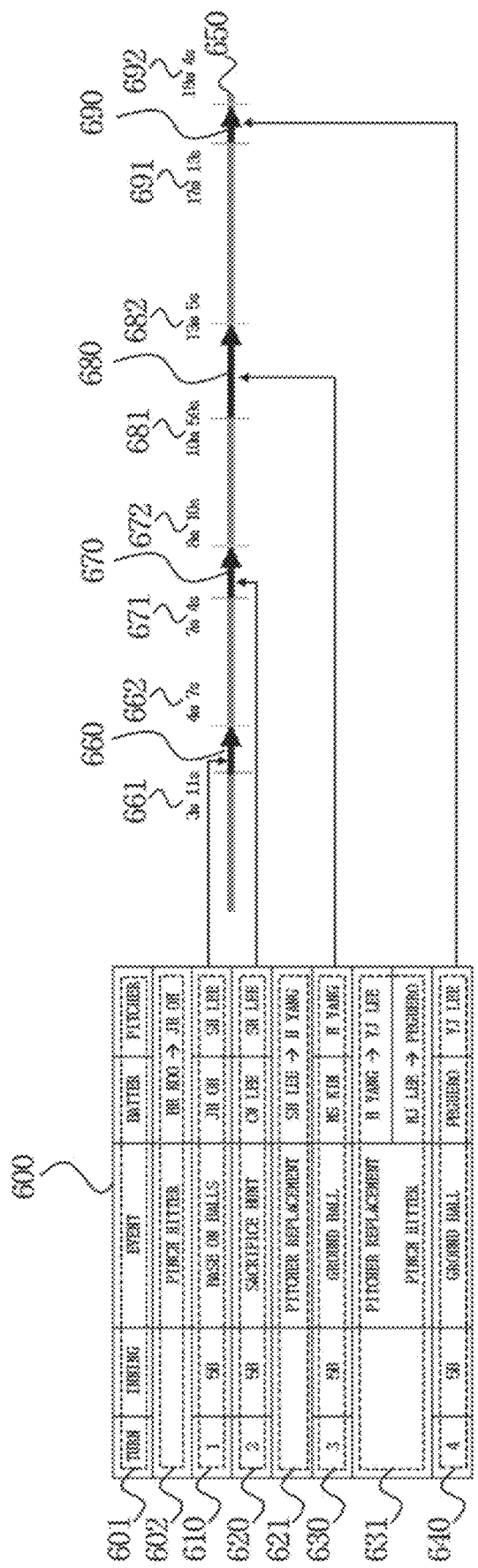
FIG. 6 is a view illustrating a state in which a device for generating a video synopsis of a sports game obtains a time section corresponding to a preset event section, according to an embodiment.

FIG. 6 is a view illustrating a state in which a device for generating a video synopsis of a sports game obtains a time section corresponding to a preset event section, according to an embodiment.

Referring to FIG. 6, according to an embodiment, the device for generating a video synopsis of a sports game may obtain events 610, 620, 630, and 640 occurring in a baseball game from log information 600.

According to an embodiment, the log information 600 may include information 601 about turn, inning, event, batter, and pitcher, but information included in the log information 600 is not limited thereto.

According to an embodiment, the device for generating a video synopsis of a sports game may obtain player change events 601, 621, and 631 from the log information 600.

According to an embodiment, the device for generating a video synopsis of a sports game may obtain time sections 661, 662, 671, 672, 681, 682, 691, and 692 of event sections 660, 670, 680, and 690 by matching the event sections 660, 670, 680, and 690 corresponding to the preset events 610, 620, 630, and 640 occurring in a baseball game with a timeline 650 of a baseball game video.

According to an embodiment, the start point in time 661 of the first event section 660 obtained from the timeline 650 of the baseball game video is 3 minutes 11 seconds, and the end point in time 662 is 4 minutes 7 seconds.

According to an embodiment, the start point in time 671 of the second event section 670 obtained from the timeline 650 of the baseball game video is 7 minutes 4 seconds, and the end point in time 672 is 8 minutes 11 seconds.

According to an embodiment, the start point in time 681 of the third event section 680 obtained from the timeline 650 of the baseball game video is 10 minutes 59 seconds, and the end point in time 682 is 13 minutes 5 seconds.

According to an embodiment, the start point in time 691 of the fourth event section 690 obtained from the timeline 650 of the baseball game video is 17 minutes 13 seconds, and the end point in time 692 is 18 minutes 4 seconds.

Figure 7:
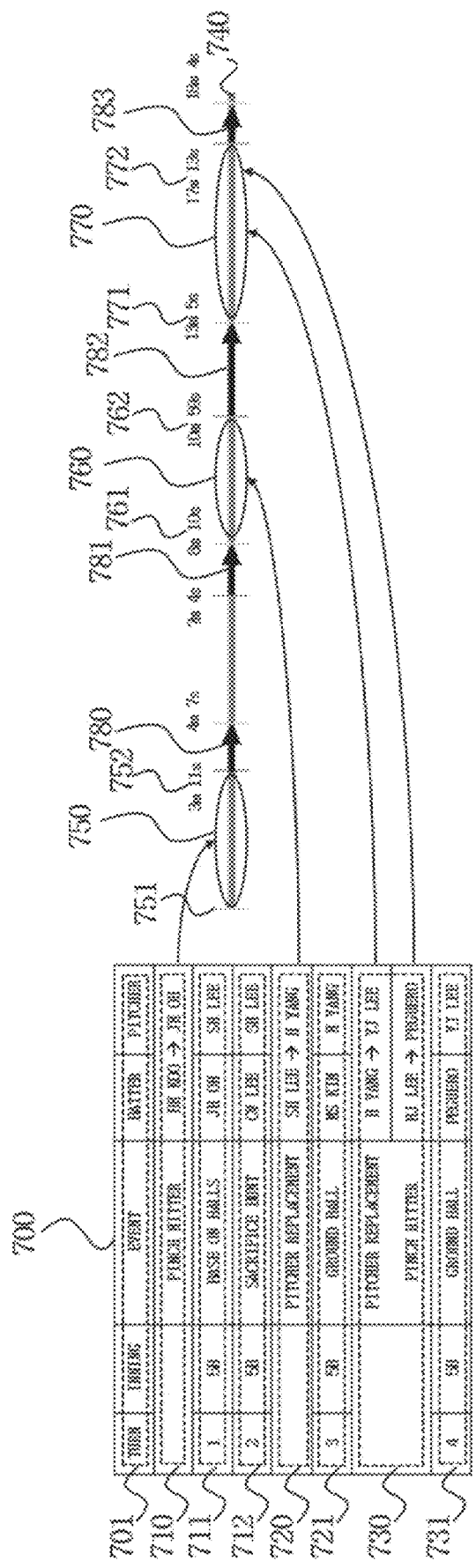
FIG. 7 is a view illustrating a state in which a device for generating a video synopsis of a sports game determines a search section, according to an embodiment.

FIG. 7 is a view illustrating a state in which a device for generating a video synopsis of a sports game determines a search section, according to an embodiment.

Referring to FIG. 7, according to an embodiment, the device for generating a video synopsis of a sports game may obtain player change events 710, 720, and 730 occurring in a baseball game from log information 700.

According to an embodiment, the log information 700 may include information 701 about turn, inning, event, batter, and pitcher, but information included in the log information 700 is not limited thereto.

According to an embodiment, the device for generating a video synopsis of a sports game may obtain preset events 711, 712, 721, and 731 occurring in a baseball game from log information 700.

According to an embodiment, the device for generating a video synopsis of a sports game may determine between end points in time 751, 761, and 771 of event sections 780, 781, 782, and 783 before the player change events 710, 720, and 730 and start points in time 752, 762, and 772 of the event sections 780, 781, 782, and 783 after the player change events 710, 720, and 730 as search sections 750, 760, and 770.

According to an embodiment, the device for generating a video synopsis of a sports game may obtain the time sections 751, 752, 761, 762, 771, and 772 of the search sections 750, 760, and 770 by matching the search sections 750, 760, and 770 corresponding to the player change events 710, 720, and 730 occurring in a baseball game with a timeline 740 of a baseball game video.

According to an embodiment, the start point in time 751 of the first search section 750 obtained from the timeline 740 of the baseball game video is the end point in time 751 of the event section 780 before the player change event 710, and the end point in time 752 of the first search section 750 obtained from the timeline 740 of the baseball game video is 3 minutes 11 seconds, which is the start point in time 752 of the event section 780 after the player change event 710.

According to an embodiment, the start point in time 761 of the second search section 760 obtained from the timeline 740 of the baseball game video is 8 minutes 10 seconds, which is the end point in time 761 of the event section 781 before the player change event 720, and the end point in time 762 of the second search section 760 obtained from the timeline 740 of the baseball game video is 10 minutes 59 seconds, which is the start point in time 762 of the event section 782 after the player change event 720.

According to an embodiment, the start point in time 771 of the third search section 770 obtained from the timeline 740 of the baseball game video is 13 minutes 5 seconds, which is the end point in time 771 of the event section 782 before the player change event 730, and the end point in time 722 of the third search section 770 obtained from the timeline 740 of the baseball game video is 17 minutes 13 seconds, which is the start point in time 772 of the event section 783 after the player change event 730.

Figure 8:
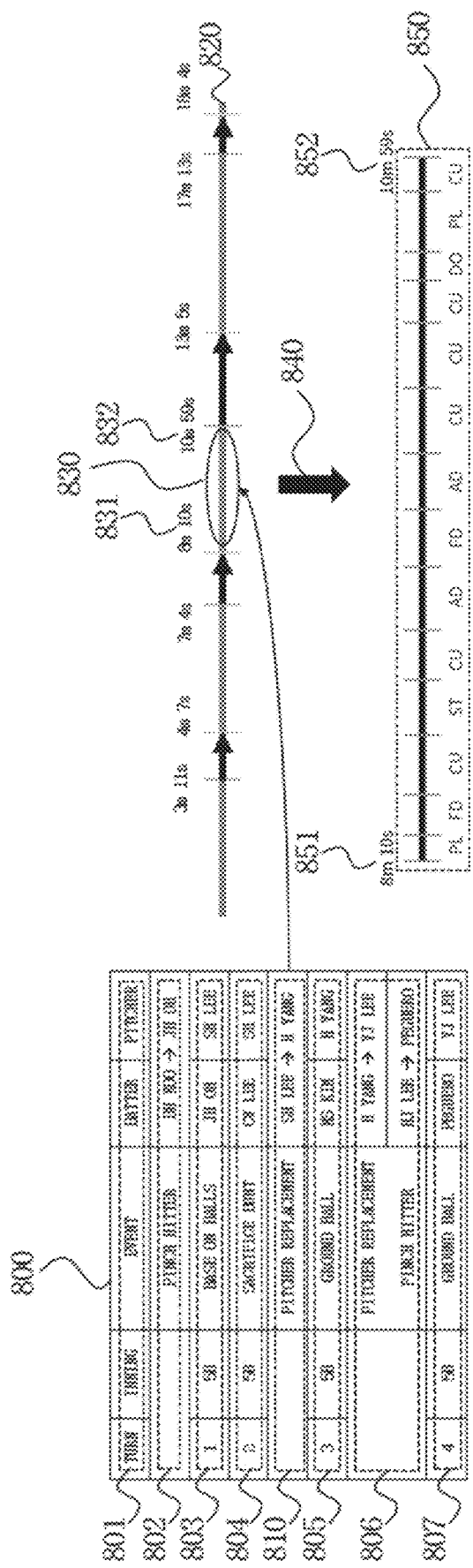
FIG. 8 is a view illustrating a state in which a device for generating a video synopsis of a sports game classifies scene sections included in a search section by applying scene change detection and scene change recognition to the search section, according to an embodiment.

FIG. 8 is a view illustrating a state in which a device for generating a video synopsis of a sports game classifies scene sections included in a search section by applying scene change detection and scene change recognition to the search section, according to an embodiment.

Referring to FIG. 8, according to an embodiment, the device for generating a video synopsis of a sports game may obtain a player change event 810 occurring in a baseball game from log information 800.

According to an embodiment, the log information 800 may include information 801 about turn, inning, event, batter, and pitcher, but information included in the log information 800 is not limited thereto.

According to an embodiment, the device for generating a video synopsis of a sports game may obtain a player change event occurring in a baseball game or preset events 802, 803, 804, 805, 806, 807, and 810 from the log information 800.

According to an embodiment, the device for generating a video synopsis of a sports game may obtain time sections 831 and 832 of a search section 830 by matching the search section 830 corresponding to the player change event 810 with a timeline 820 of a baseball game video.

According to an embodiment, the device for generating a video synopsis of a sports game may classify (850) each of scene sections included in the search section 830 by scene type by applying (840) scene change detection and scene recognition to the search section 830.

According to an embodiment, the device for generating a video synopsis of a sports game may apply scene change detection to the search section 830 and divide the search section 830 into a plurality of scene sections based on a scene change order.

According to an embodiment, the device for generating a video synopsis of a sports game may classify (850) each of the plurality of divided scene sections by scene type by applying scene recognition to each of the plurality of divided scene sections.

According to an embodiment, the device for generating a video synopsis of a sports game may classify each scene section into one of pitching (PL), field (FL), close-up (CU), spectators (ST), and dugout (DO), but the type of scene into which each of the scene sections may be classified is not limited thereto.

According to an embodiment, a start point in time 851 of the scene section classified by scene type (850) is 8 minutes 10 seconds, the same as a start point in time 831 of the search section 830, and an end point in time 852 of the scene section classified by scene type (850) is 10 minutes 59 seconds, the same as an end point in time 832 of the search section 830.

Figure 9:
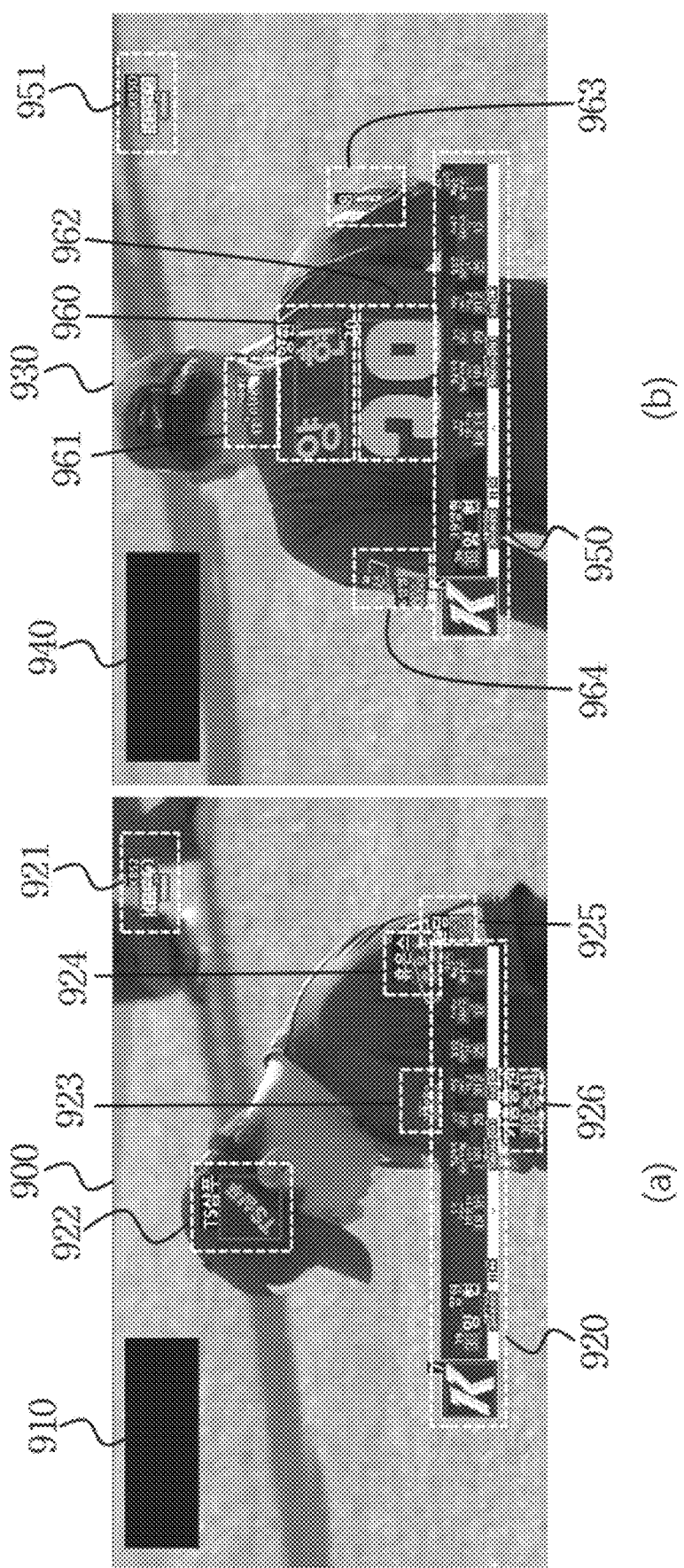
FIG. 9 is a view illustrating a state in which a device for generating a video synopsis of a sports game detects preset characters in a pre-processed scene section, according to an embodiment.

FIG. 9 is a view illustrating a state in which a device for generating a video synopsis of a sports game detects preset characters in a pre-processed scene section, according to an embodiment.

Referring to FIG. 9, FIG. 9 (a) is a part of a scene section in which the side of a substitute player is expressed in a video introducing the substitute player, and FIG. 9 (b) is a part of a scene section in which the name and uniform number of the substitute player are expressed in the video introducing the substitute player.

Referring to FIG. 9 (a), according to an embodiment, in order that the device for generating a video synopsis of a sports game does not detect the player's name appearing in a broadcast subtitle in a close-up scene section 900 introducing the substitute player, a broadcast subtitle area included in the close-up scene section 900 is masked (910).

According to an embodiment, the device for generating a video synopsis of a sports game may detect the name of the substitute player by applying character detection and recognition in an area 920 displaying information about the substitute player.

According to an embodiment, the device for generating a video synopsis of a sports game may detect the name of the substitute player by applying character detection and recognition (921, 922, 923, 924, 925, and 926) to an area other than the area 920 displaying information about the substitute player in the close-up scene section 900 where the side of the substitute player is displayed.

Referring to FIG. 9 (b), according to an embodiment, in order that the device for generating a video synopsis of a sports game does not detect the player's name appearing in a broadcast subtitle in a close-up scene section 930 introducing the substitute player, a broadcast subtitle area included in the close-up scene section 930 is masked (940).

According to an embodiment, the device for generating a video synopsis of a sports game may detect the name of the substitute player by applying character detection and recognition in an area 950 displaying information about the substitute player.

According to an embodiment, the device for generating a video synopsis of a sports game may detect the name of the substitute player by applying character detection and recognition (951, 961, 962, 963, and 964) to an area other than the area 950 displaying information about the substitute player in the close-up scene section 930 where the name and uniform number of the substitute player is displayed.

According to an embodiment, the device for generating a video synopsis of a sports game may detect a name 960 of the substitute player in the uniform of the substitute player.

According to an embodiment, the device for generating a video synopsis of a sports game may match the number of detections of the name of the substitute player in a close-up scene section with the close-up scene sections, respectively, and store them in a memory.

Figure 10:
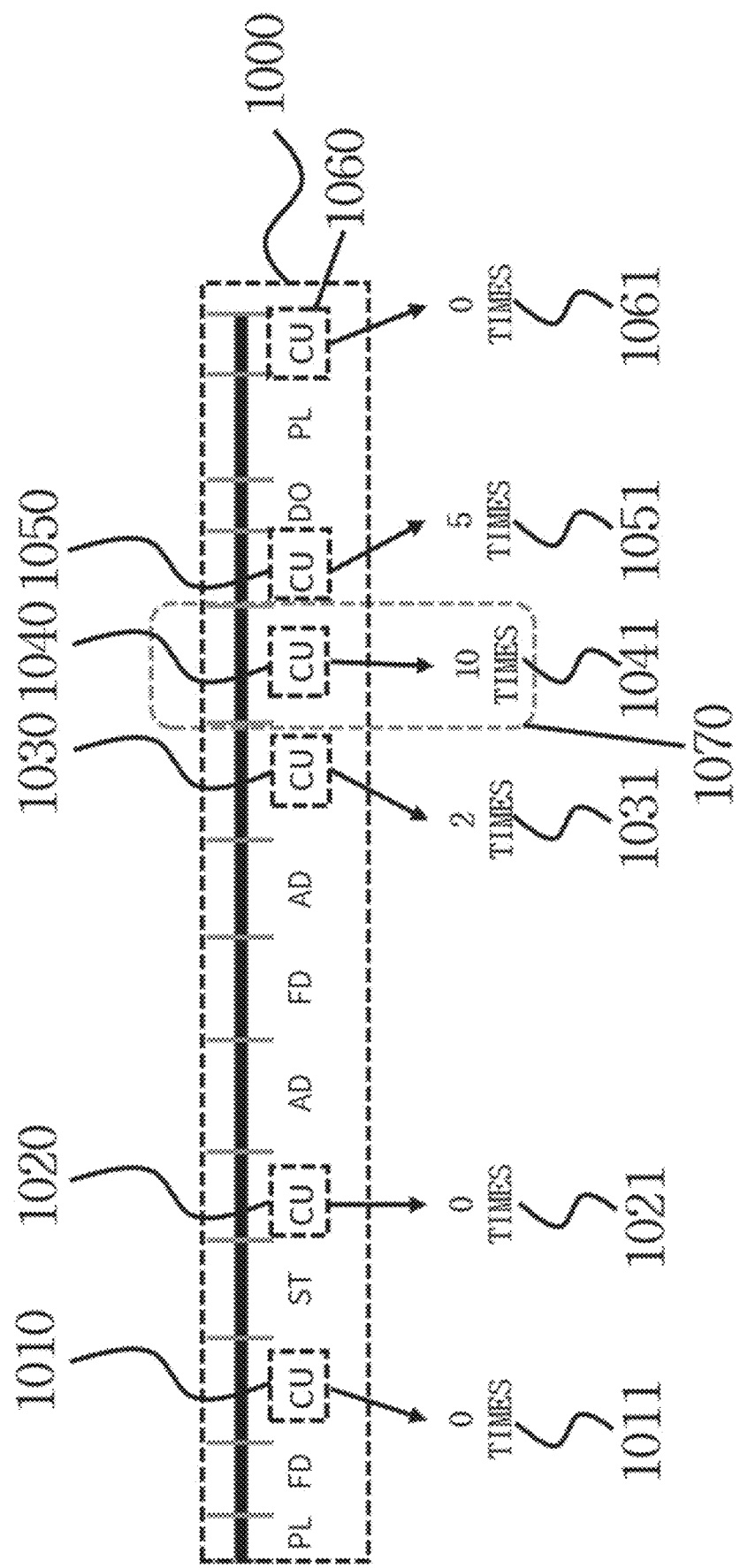
FIG. 10 is a view illustrating a state in which a device for generating a video synopsis of a sports game selects a representative scene based on the number of detections of a preset object from a classified scene, according to an embodiment.

FIG. 10 is a view illustrating a state in which a device for generating a video synopsis of a sports game selects a representative scene based on the number of detections of a preset object from a classified scene, according to an embodiment.

Referring to FIG. 10, according to an embodiment, the device for generating a video synopsis of a sports game may determine the representative scene section based on the number of detections of a preset object in a close-up scene section in which subtitles introducing a substitute player most appear.

According to an embodiment, the device for generating a video synopsis of a sports game may match the number of detections of the preset object in the close-up scene section with the close-up scene sections, respectively, and store them in a memory.

According to an embodiment, the device for generating a video synopsis of a sports game may determine the representative scene section based on the number of detections of the preset object in the close-up scene section, a field scene section, or a dugout scene section. In this case, the scene section for detecting the preset object is not limited to the close-up scene section, the field scene section, or the dugout scene section.

According to an embodiment, the device for generating a video synopsis of a sports game may determine a representative scene section 1070 based on the number of detections of a preset object (1011, 1021, 1031, 1041, 1051, and 1061) in close-up scene sections 1010, 1020, 1030, 1040, 1050, and 1060 in a scene section 1000 classified by scene type.

According to an embodiment, when the sports game is a baseball game, the device for generating a video synopsis of a sports game may apply character recognition and detection to the close-up scene sections 1010, 1020, 1030, 1040, 1050, and 1060, match the number of detections of the substitute player's name (1011, 1021, 1031, 1041, 1051, and 1061) with the close-up scene sections 1010, 1020, 1030, 1040, 1050, and 1060, respectively, and store them in the memory, and determine the close-up scene section 1040 in which the number of detections of the substitute player's name is the largest 10 times from among the stored close-up scene sections 1010, 1020, 1030, 1040, 1050, and 1060 as the representative scene section 1070.

According to an embodiment, the device for generating a video synopsis of a sports game may determine a scene section having a longer scene length as the representative scene section when the number of detection of a preset object in the close-up scene sections 1010, 1020, 1030, 1040, 1050, and 1060 in the scene section 1000 classified by scene type is the same.

Figure 11:
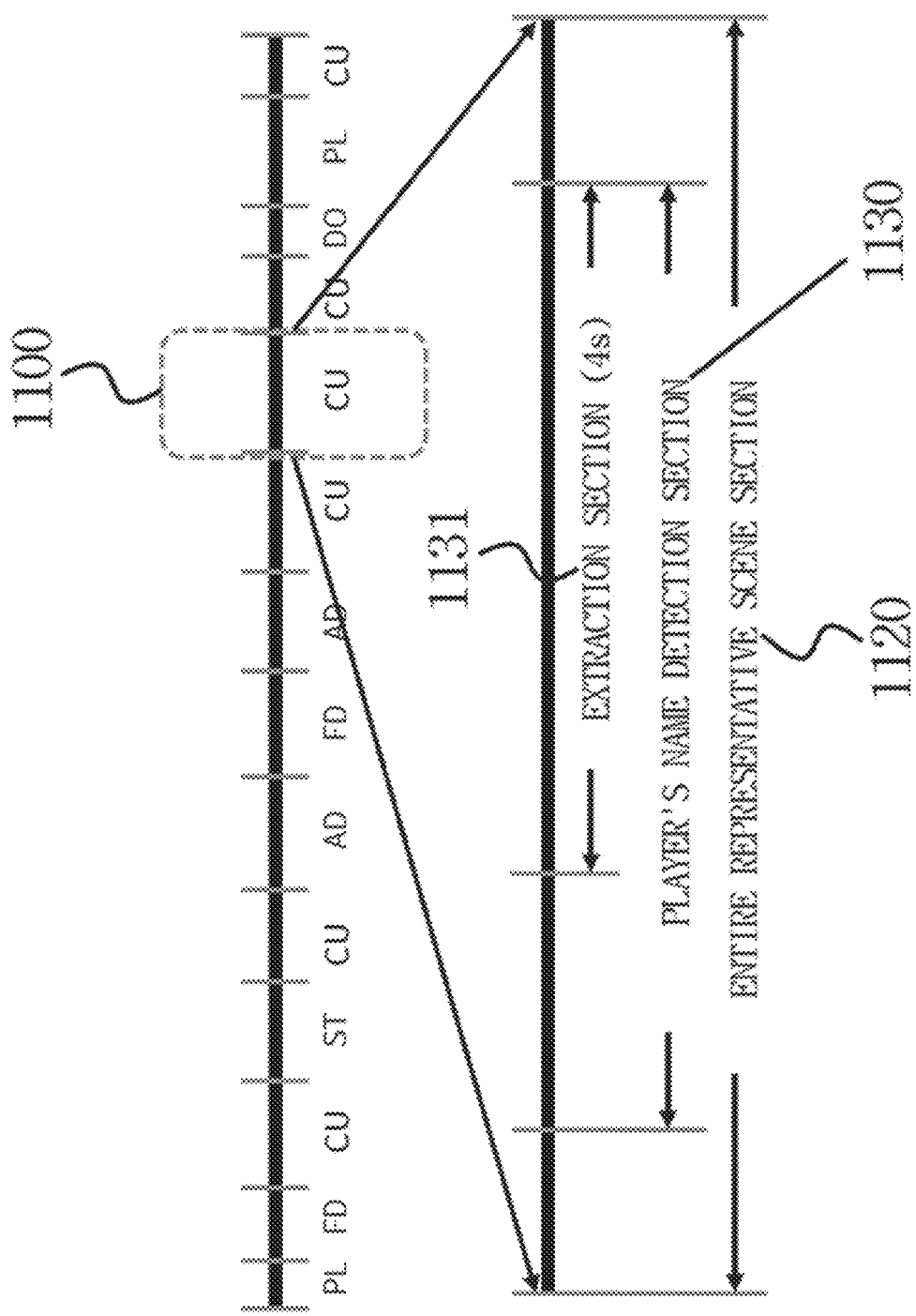
FIG. 11 is a view illustrating a state in which a device for generating a video synopsis of a sports game determines an extraction section based on a representative scene section, according to an embodiment.

FIG. 11 is a view illustrating a state in which a device for generating a video synopsis of a sports game determines an extraction section based on a representative scene section, according to an embodiment.

Referring to FIG. 11, according to an embodiment, the device for generating a video synopsis of a sports game may acquire an entire representative scene section 1120 from a representative scene section 1100.

According to an embodiment, the device for generating a video synopsis of a sports game may obtain a player's name detection section 1130 in which a substitute player's name is detected in the obtained entire representative scene section 1120.

According to an embodiment, the device for generating a video synopsis of a sports game may determine an extraction section 1131 in which an image having a preset length (e.g., 4 seconds) is extracted from the player's name detection section 1131.

According to an embodiment, the device for generating a video synopsis of a sports game may determine a point in time that goes back by a preset length (e.g., 4 seconds) from the end of the player's name detection section 1130 as a point in time of the extraction section 1130.

Figure 12:
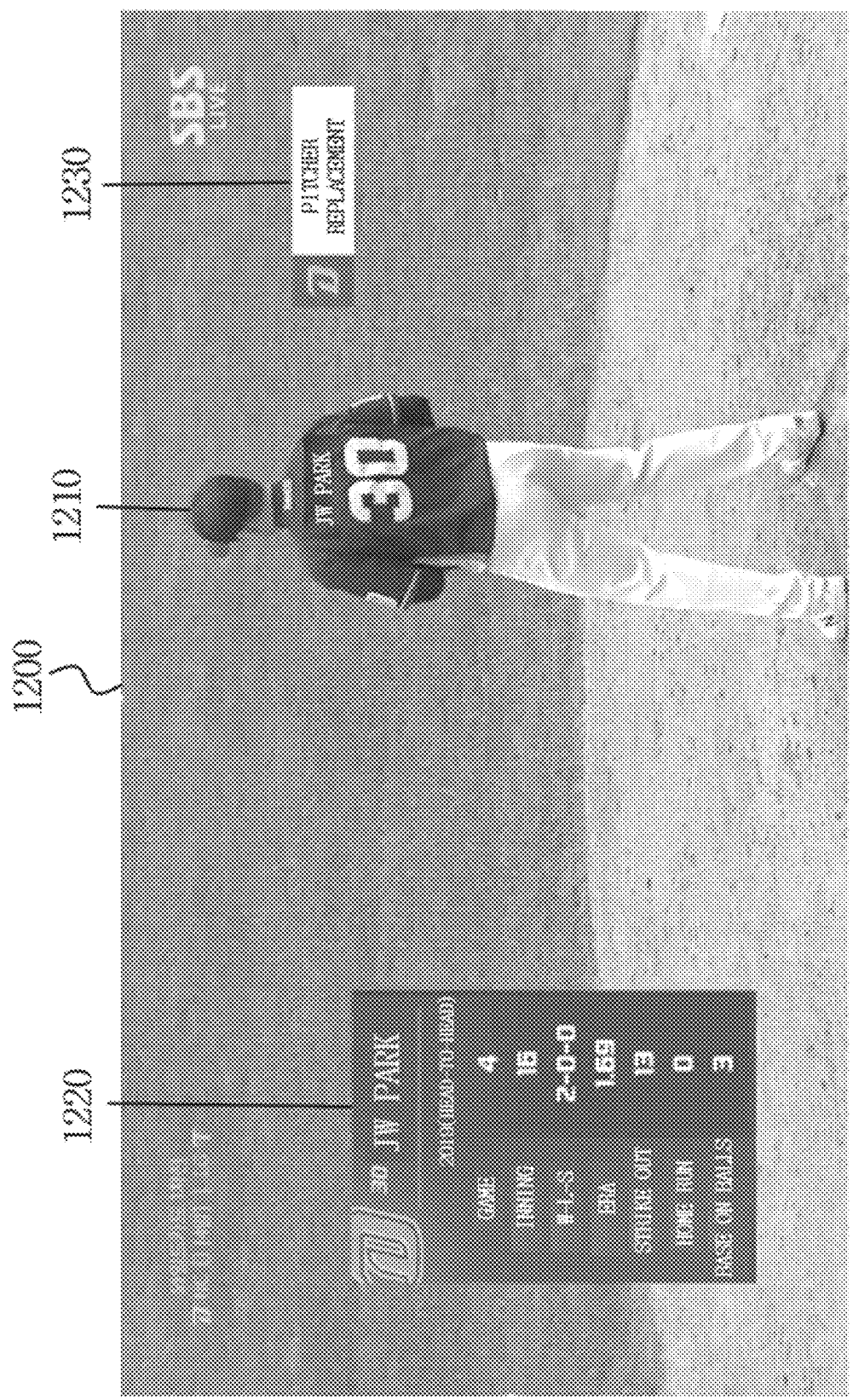
FIG. 12 is a view illustrating a state in which a device for generating a video synopsis of a sports game adds a description to a video synopsis of a sports game, according to an embodiment.

FIG. 12 is a view illustrating a state in which a device for generating a video synopsis of a sports game adds a description to a video synopsis of a sports game, according to an embodiment.

Referring to FIG. 12, a baseball game video 1200 may include a subtitle 1220 introducing a substitute player 1210.

According to an embodiment, the device for generating a video synopsis of a sports game may add a description 1230 of the substitute player 1210 in addition to the subtitle 1220 introducing the substitute player 1210 included in the baseball game video 1200 based on log information. In this case, the description 1230 may be implemented in the form of a window and may be expressed by overlapping the first video in FIG. 1.

Figure 13:
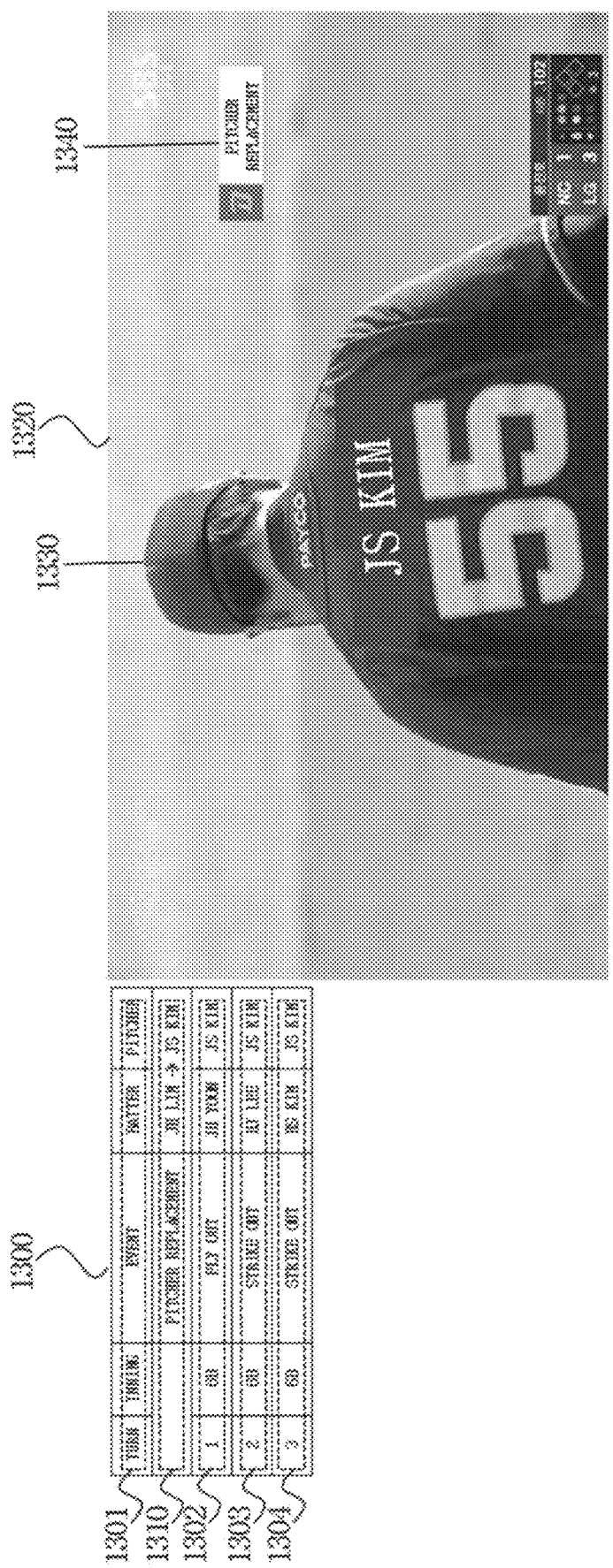
FIG. 13 is a view illustrating a state in which a device for generating a video synopsis of a sports game adds a description to a video synopsis of a sports game, according to another embodiment.

FIG. 13 is a view illustrating a state in which a device for generating a video synopsis of a sports game adds a description to a video synopsis of a sports game, according to another embodiment.

Referring to FIG. 13, according to an embodiment, the device for generating a video synopsis of a sports game may obtain a player change event 1310 occurring in a baseball game from log information 1300.

According to an embodiment, the log information 1300 may include information 1301 about turn, inning, event, batter, and pitcher, but information included in the log information 1300 is not limited thereto.

According to an embodiment, the device for generating a video synopsis of a sports game may obtain preset events 1302, 1303, and 1304 occurring in a baseball game from log information 1300.

According to an embodiment, a baseball game video 1320 may not include a subtitle introducing a substitute player 1330.

Referring back to FIGS. 11 and 13, according to an embodiment, a subtitle introducing the substitute player 1330 may not be included in the extraction section 1130 extracted from the representative scene section.

Referring back to FIG. 13, according to an embodiment, the device for generating a video synopsis of a sports game may add a description 1340 of the substitute player 1330 based on log information 1300. In this case, the description 1340 may be implemented in the form of a window and may be expressed by overlapping the first video.

Figure 14:
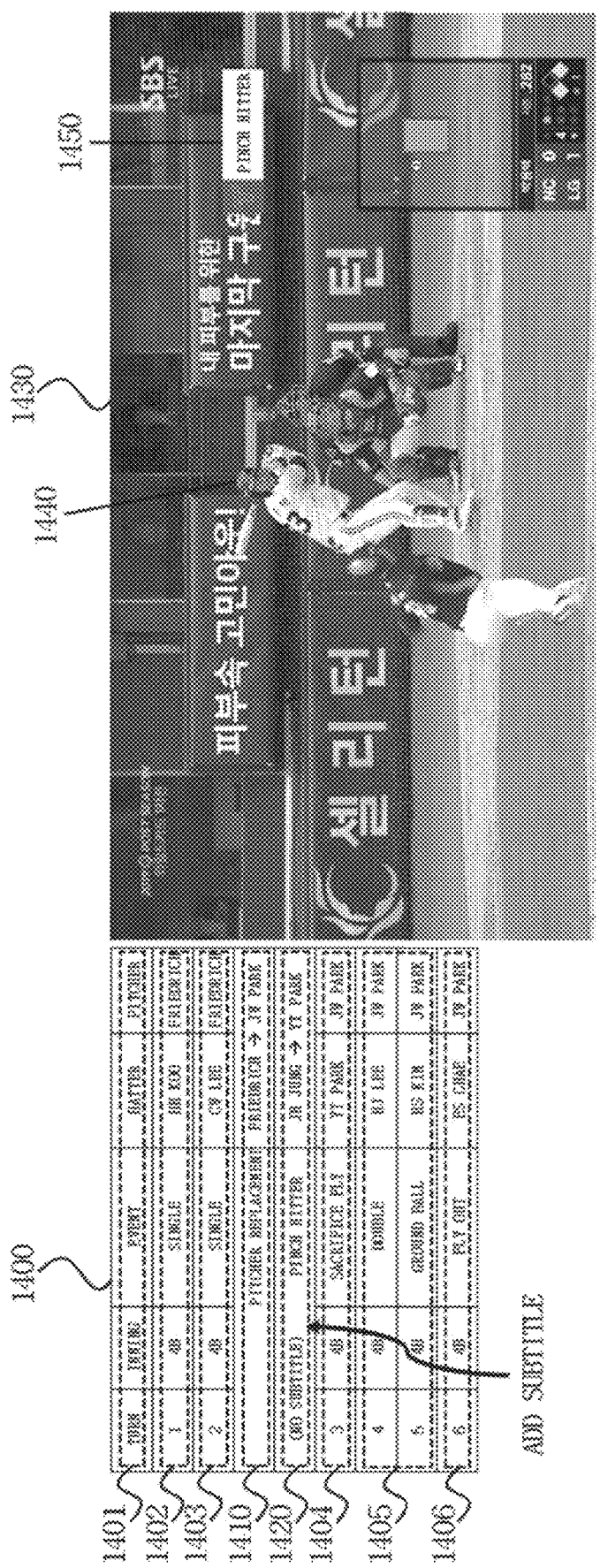
FIG. 14 is a view illustrating a state in which a device for generating a video synopsis of a sports game adds a description to a video synopsis of a sports game, according to another embodiment.

FIG. 14 is a view illustrating a state in which a device for generating a video synopsis of a sports game adds a description to a video synopsis of a sports game, according to another embodiment.

Referring to FIG. 14, according to an embodiment, the device for generating a video synopsis of a sports game may obtain player change events 1410 and 1420 occurring in a baseball game from log information 1400.

According to an embodiment, the log information 1400 may include information 1401 about turn, inning, event, batter, and pitcher, but information included in the log information 1400 is not limited thereto.

According to an embodiment, the device for generating a video synopsis of a sports game may obtain a player change event occurring in a baseball game or preset events 1402, 1403, 1404, 1405, and 1406 from the log information 1400.

According to an embodiment, a baseball game video 1430 may not include a subtitle introducing a substitute player 1440.

Referring back to FIGS. 11 and 14, according to an embodiment, a subtitle introducing the substitute player 1440 may not be included in the extraction section 1130 extracted from the representative scene section.

Referring back to FIG. 14, according to an embodiment, the device for generating a video synopsis of a sports game may add a description 1450 of the substitute player 1440 based on log information 1400. In this case, the description 1450 may be implemented in the form of a window and may be expressed by overlapping the first video.

Figure 15:
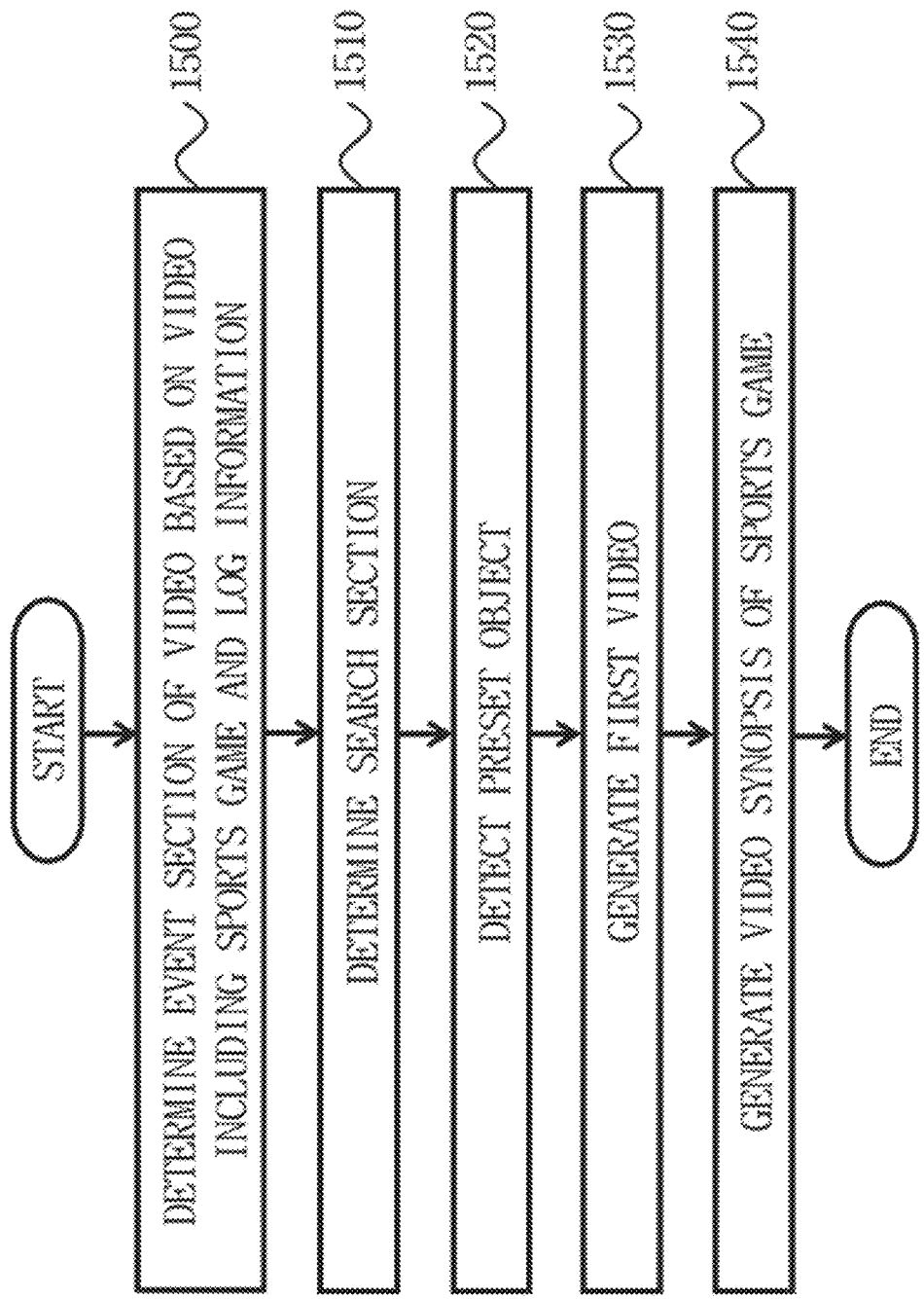
FIG. 15 is a flowchart illustrating a method of generating a video synopsis of a sports game according to an embodiment.

FIG. 15 is a flowchart illustrating a method of generating a video synopsis of a sports game according to an embodiment.

Referring to FIG. 15, in operation 1500, a device for generating a video synopsis of a sports game, based on a video including a sports game and log information sequentially recording events occurring in the sports game, determines an event section of the video corresponding to a preset event.

In this case, the device for generating a video synopsis of a sports game may identify the video including the sports game and the log information sequentially recording events occurring in the sports game.

In addition, the device for generating a video synopsis of a sports game may tag game information related to the video to the video.

In addition, the device for generating a video synopsis of a sports game may extract at least one piece of log information corresponding to the preset event, and may determine an event section corresponding to the extracted log information from the tagged video.

In addition, the device for generating a video synopsis of a sports game may generate a second video by combining videos corresponding to the determined event section based on log information.

In operation 1510, the device for generating a video synopsis of a sports game determines a search section in the video based on log information and the determined event section.

In this case, the device for generating a video synopsis of a sports game may obtain a time section corresponding to the determined event section from the video based on log information.

In addition, the device for generating a video synopsis of a sports game, when the determined event section is plural in the video based on the log information, may obtain a plurality of time sections (start points in time and end points in time of the event sections) respectively corresponding to the plurality of determined event sections.

In addition, the device for generating a video synopsis of a sports game may determine a search section from the video based on a time section corresponding to the obtained event section.

In addition, when the device for generating a video synopsis of a sports game determines between an $n^{th}$ event and an $(n+1)^{th}$ event as a search section, the device for generating a video synopsis of a sports game may determine between an end point in time of a time section corresponding to an $n^{th}$ event section and a start point in time of a time section corresponding to an $(n+1)^{th}$ event section as a search section.

In operation 1520, the device for generating a video synopsis of a sports game detects a preset object in at least one scene section included in the search section.

In this case, the device for generating a video synopsis of a sports game may divide the search section into a plurality of scene sections by applying a scene change detection method to the determined search section.

In addition, the device for generating a video synopsis of a sports game may classify each of the plurality of divided scene sections by scene type by applying a scene recognition method to each of the plurality of divided scene sections. At this time, the type of scene may be any one of pitching, pitching enlargement, close-up, field (ball tracking), advertisement, commentary, spectators, dugout, game sketch, field view, and dual screen (PIP), but the type of scene is not limited thereto.

In addition, the device for generating a video synopsis of a sports game may pre-process at least one scene section classified into a preset scene type from among the classified scene sections, and may detect the preset object by applying a character detection and recognition method to the pre-processed scene section.

In operation 1530, the device for generating a video synopsis of a sports game generates a first video based on the at least one scene section in which the preset object is detected.

In this case, the device for generating a video synopsis of a sports game may determine a representative scene section based on the number of detections of a preset object.

In addition, the device for generating a video synopsis of a sports game may obtain a section in which a preset object is detected in the representative scene section.

In addition, the device for generating a video synopsis of a sports game may generate a first video by extracting a section from a point in time that goes back by a preset time (e.g., 4 seconds) from the end of the section in which the preset object is detected to the end of the section in which the preset object is detected.

Also, the device for generating a video synopsis of a sports game may add a description of the detected preset object to the generated first video based on log information. In this case, the description may be implemented in the form of a window and may be expressed by overlapping the first video.

In operation 1540, the device for generating a video synopsis of a sports game generates a video synopsis of a sports game.

The device for generating a video synopsis of a sports game may generate a second video by combining videos corresponding to an event section of a video including a sports game based on log information, and may generate a video synopsis of a sports game by inserting the first video into the generated second video based on the log information.

In addition, the device for generating a video synopsis of a sports game may generate a video synopsis of a sports game by combining n first videos generated based on a scene section in which a preset object is detected and m second videos generated based on an event section of a video including a sports game, based on log information.

In addition, the device for generating a video synopsis of a sports game, by combining videos corresponding to an event section of a video including a sports game based on log information, may generate a video synopsis of a sports game by inserting the first video into the generated second video based on the log information.

According to an embodiment, a video synopsis of a sports game may be generated based on a video including a sports game and log information.

In addition, a search section may be determined in the video including the sports game and a video may be generated based on a scene included in the determined search section.

In addition, a description may be added to the video synopsis of the sports game. In addition, a search section may be determined in the video including a sports game and a preset object may be detected by dividing or classifying the determined search section into a plurality of scenes.

Hereinabove, all components according to the embodiments are described to be combined as one or are described to operate by being combined with each other, but the disclosure is not limited thereto. In other words, at least two of the components may selectively combine to operate within the scopes of the disclosure.

Also, each of the components may be realized as independent hardware, or some or all of the components may be selectively combined to be realized as a computer program having a program module in which some or all functions are performed in one or more hardware. Codes, and code segments for configuring the computer program may be easily construed by one of ordinary skill in the art to which embodiments belong.

Such a computer program may be stored in a computer readable medium and read and executed by a computer, thereby implementing the embodiment. Examples of the computer readable medium of the computer program may be a magnetic recording medium, an optical recording medium, or the like.

Furthermore, when a part "includes", "comprises", or "has" an element, unless there is a particular description contrary thereto, the part may further include other elements, not excluding the other elements.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The methods disclosed in the disclosure include one or more operations or actions for achieving the methods. The operations and/or actions for achieving the methods may be interchanged with one another without departing from the scope of the claims. In other words, the order and/or use of specific operations and/or actions may be modified without departing from the scope of the claims, unless a certain order for the operations and/or actions is specified.

As used herein, a phrase referring to "at least one of" a list of items refers to any combination of these items, including single members. As an example, "at least one of a, b, or c:" is intended to include any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c), as well as a, b, c, a-b, a-c, b-c, and a-b-c.

As used herein, the term "determining" encompasses a wide variety of actions. For example, the term "determining" may include computing, processing, deriving, examining, looking up (e.g., looking up in a table, database, or other data structure), identifying, and the like. The term "determining" may also include receiving (e.g., receiving information), accessing (accessing data in a memory), and the like. The term "determining" may also include resolving, selecting, choosing, establishing, and the like.

The description herein is for the purpose of describing the disclosure and numerous modifications and adaptations will be readily apparent to one of ordinary skill in the art without departing from the spirit and scope of the disclosure.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. A method of generating a video synopsis of a sports game, the method comprising:
    based on a video including a sports game and log information sequentially recording events occurring in the sports game, determining an event section of the video corresponding to a preset event;
    determining a search section in the video based on the log information and the determined event section;
    detecting a preset object in at least one scene section included in a search section; and
    generating a first video based on the at least one scene section in which the preset object is detected.

2. The method of claim 1, further comprising:
    generating a second video based on the determined event section of the video.

3. The method of claim 2, further comprising:
    generating a video synopsis of a sports game by combining the generated first video and the generated second video based on the log information.

4. The method of claim 1, further comprising:
    adding a description of the detected preset object to the generated first video based on the log information.

5. The method of claim 1, wherein the determining of an event section of the video comprises:
    identifying a video including a sports game and log information sequentially recording events occurring in the sports game;
    tagging game information related to the video to the video; and
    extracting at least one piece of log information corresponding to the preset event and determining an event section corresponding to the extracted log information from the tagged video.

6. The method of claim 1, wherein the determining of a search section in the video comprises:

obtaining a time section corresponding to the determined event section from the video based on the log information; and determining a search section in the video based on a time section corresponding to the obtained event section.

7. The method of claim 1, wherein the detecting of a preset object comprises:

dividing the search section into a plurality of scene sections by applying a first method to the determined search section;

classifying each of the plurality of divided scene sections by scene type by applying a second method to each of the plurality of divided scene sections; and detecting the preset object in at least one scene section classified into a preset scene type from among the plurality of classified scene sections.

8. The method of claim 7, wherein the first method is a scene change detection method, and the second method is a scene recognition method.

9. The method of claim 7, wherein the detecting of a preset object comprises:

detecting the preset object by applying a character detection and recognition method to the at least one scene section.

10. The method of claim 1, wherein the generating of the first video comprises:

determining a representative scene section based on the number of detections of the preset object; and generating the first video based on the determined representative scene section.

11. A device for generating a video synopsis of a sports game, the device comprising:

at least one processor, wherein the at least one processor, based on a video including a sports game and log information sequentially recording events occurring in the sports game, determines an event section of the video corresponding to a preset event, determines a search section in the video based on the log information and the determined event section, detects a preset object in at least one scene section included in the search section, and generates a first video based on the at least one scene section in which the preset object is detected.

12. The device of claim 11, wherein the at least one processor generates a second video based on the determined event section of the video.

13. The device of claim 12, wherein the at least one processor generates a video synopsis of a sports game by combining the generated second video and the generated first video based on the log information.

14. The device of claim 11, wherein the at least one processor adds a description of the detected preset object to the generated first video based on the log information.

15. The device of claim 11, wherein the at least one processor identifies a video including a sports game and log information sequentially recording events occurring in the sports game, tags game information related to the video to the video, and extracts at least one piece of log information corresponding to the preset event and determines an event section corresponding to the extracted log information from the tagged video.

16. The device of claim 11, wherein the at least one processor obtains a time section corresponding to the determined event section from the video based on the log information, and determines a search section in the video based on a time section corresponding to the obtained event section.

17. The device of claim 11, wherein the at least one processor divides the search section into a plurality of scene sections by applying a first method to the determined search section, classifies each of the plurality of divided scene sections by scene type by applying a second method to each of the plurality of divided scene sections, and detects the preset object in at least one scene section classified into a preset scene type from among the plurality of classified scene sections.

18. The device of claim 17, wherein the first method is a scene change detection method, and the second method is a scene recognition method.

19. The device of claim 17, wherein the at least one processor detects the preset object by applying a character detection and recognition method to the at least one scene section.

20. The device of claim 11, wherein the at least one processor determines a representative scene section based on the number of detections of the preset object, and generates a first video based on the determined representative scene section.

* * * * *